US011127947B2

United States Patent
Takano et al.

(10) Patent No.: US 11,127,947 B2
(45) Date of Patent: *Sep. 21, 2021

(54) SILICON NANOPARTICLE-CONTAINING HYDROGEN POLYSILSESQUIOXANE CALCINED PRODUCT, NEGATIVE ELECTRODE ACTIVE MATERIAL FOR LITHIUM ION BATTERY, NEGATIVE ELECTRODE FOR LITHIUM ION BATTERY AND LITHIUM ION BATTERY

(71) Applicants: JNC CORPORATION, Tokyo (JP); JNC PETROCHEMICAL CORPORATION, Tokyo (JP)

(72) Inventors: Yoshihito Takano, Chiba (JP); Tetsuro Kizaki, Chiba (JP); Hirotsuna Yamada, Chiba (JP); Masakazu Kondo, Chiba (JP); Akira Takahashi, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 178 days.

This patent is subject to a terminal disclaimer.

(21) Appl. No.: 16/477,199

(22) PCT Filed: Jan. 10, 2018

(86) PCT No.: PCT/JP2018/000347
§ 371 (c)(1),
(2) Date: Jul. 11, 2019

(87) PCT Pub. No.: WO2018/131607
PCT Pub. Date: Jul. 19, 2018

(65) Prior Publication Data
US 2019/0363352 A1 Nov. 28, 2019

(30) Foreign Application Priority Data
Jan. 11, 2017 (JP) .............................. JP2017-002954

(51) Int. Cl.
*H01M 4/00* (2006.01)
*H01M 4/36* (2006.01)
(Continued)

(52) U.S. Cl.
CPC .......... *H01M 4/366* (2013.01); *C01B 33/181* (2013.01); *H01M 4/386* (2013.01); *H01M 4/628* (2013.01);
(Continued)

(58) Field of Classification Search
CPC ...... H01M 4/366; H01M 4/386; H01M 4/628; H01M 10/0525; H01M 2004/021;
(Continued)

(56) References Cited

U.S. PATENT DOCUMENTS

| 11,027,978 B2 * | 6/2021 | Takano | .................. H01M 4/58 |
| 11,031,591 B2 * | 6/2021 | Takano | ................ H01M 4/485 |
| 2008/0166634 A1 * | 7/2008 | Kim | ...................... H01M 4/131 |
| | | | 429/218.1 |

FOREIGN PATENT DOCUMENTS

| JP | S6290863 | 4/1987 |
| JP | 2004071542 | 3/2004 |

(Continued)

OTHER PUBLICATIONS

Somodi et al., "Vesicular hydrogen silsesquioxane-mediated synthesis of nanocrystalline silicon dispersed in a mesoporous silica/suboxide matrix, with potential for electrochemical applications", New J. Chem., 2015, 39, pp. 621-630. (Year: 2014).*
(Continued)

*Primary Examiner* — Nicholas P D'Aniello
(74) *Attorney, Agent, or Firm* — JCIPRNET

(57) ABSTRACT

Provided is a silicon nanoparticle-containing hydrogen polysilsesquioxane sintered product that is represented by the general formula $SiO_xH_y$ ($0.01 < x \leq 0.3$, $0 < y < 0.35$) and has
(Continued)

Si—H bonds, said silicon nanoparticle-containing hydrogen polysilsesquioxane sintered product being characterized by (A) including more than 65.0 wt % of silicon nanoparticles that have a volume-based average particle size of 10-500 nm, exclusive, and that do not include particles having a particle size of 1000 nm or larger, and (B) including a silicon oxide structure derived from hydrogen polysilsesquioxane that coats the silicon nanoparticles and is chemically bonded to the surfaces of the silicon nanoparticles.

6 Claims, 2 Drawing Sheets

(51) Int. Cl.
    *C01B 33/18* (2006.01)
    *H01M 4/38* (2006.01)
    *H01M 4/62* (2006.01)
    *H01M 10/0525* (2010.01)
    *H01M 4/02* (2006.01)

(52) U.S. Cl.
    CPC ..... *H01M 10/0525* (2013.01); *C01P 2002/82* (2013.01); *C01P 2004/03* (2013.01); *C01P 2004/62* (2013.01); *C01P 2004/64* (2013.01); *C01P 2006/40* (2013.01); *H01M 2004/021* (2013.01); *H01M 2004/027* (2013.01)

(58) Field of Classification Search
    CPC ........... H01M 2004/027; H01M 4/483; H01M 4/625; H01M 4/134; C01B 33/181; C01B 33/02; C01B 33/113; C01P 2002/82; C01P 2004/03; C01P 2004/62; C01P 2004/64; C01P 2006/40; Y02E 60/10
    See application file for complete search history.

(56) References Cited

FOREIGN PATENT DOCUMENTS

| | | |
|---|---|---|
| JP | 2008171813 | 7/2008 |
| JP | 2016514898 | 5/2016 |
| KR | 20080064778 | 7/2008 |
| WO | 2016208314 | 12/2016 |
| WO | 2018003150 | 1/2018 |

OTHER PUBLICATIONS

"International Search Report (Form PCT/ISA/210) of PCT/JP2018/000347," dated Jun. 5, 2018, with English translation thereof, pp. 1-3.

* cited by examiner

SILICON NANOPARTICLE-CONTAINING HYDROGEN POLYSILSESQUIOXANE CALCINED PRODUCT, NEGATIVE ELECTRODE ACTIVE MATERIAL FOR LITHIUM ION BATTERY, NEGATIVE ELECTRODE FOR LITHIUM ION BATTERY AND LITHIUM ION BATTERY

CROSS-REFERENCE TO RELATED APPLICATION

This application is a 371 application of an international PCT application serial no. PCT/JP2018/000347, filed on Jan. 10, 2018, which claims the priority benefit of Japan application JP2017-002954, filed on Jan. 11, 2017. The entirety of the abovementioned patent application is hereby incorporated by reference herein and made a part of this specification.

TECHNICAL FIELD

This invention relates to a silicon nanoparticle-containing hydrogen polysilsesquioxane calcined product where a surface of a silicon nanoparticle is chemically bonded to a silicon oxide structure derived from a hydrogen polysilsesquioxane, a negative electrode active material for a lithium ion battery, containing the silicon nanoparticle-containing hydrogen polysilsesquioxane calcined product, a negative electrode for a lithium ion battery containing the negative electrode active material, and a lithium ion battery comprising the negative electrode for the lithium ion battery.

BACKGROUND ART

Various portable devices have been recently widely used in association with rapid evolution of electronic devices, communication devices and the like and development of the size reduction technologies. Then, as a power supply of the above portable devices, from the viewpoints of economic efficiency, size reduction and weight reduction of the device, development of the secondary battery having high capacity and excellent service-life properties are strongly desired.

As a small-sized, lightweight and high capacity secondary battery described above, development currently progresses on a rocking chair type lithium ion battery in which a lithium intercalation compound that releases a lithium ion from an interlayer is used as a positive electrode material and a carbonaceous material represented by graphite and the like that can intercalate or deintercalate the lithium ion into or from the interlayer between crystal planes during the charge-discharge is used as a negative electrode material, and the lithium ion battery have been brought into practical use and generally used.

A nonaqueous electrolyte secondary battery in which a lithium compound is used as a negative electrode has high voltage and high energy density, and among them, a lithium metal has been targeted by many researches as a negative electrode active material in an early stage because of high battery capacity. However, when the lithium metal is used as the negative electrode, a large amount of dendritic lithium precipitates on the surface of negative electrode lithium during charge, and therefore the charge-discharge efficiency is reduced, or the dendritic lithium grows to cause short circuiting with a positive electrode in several cases. In addition, the lithium metal itself is unstable, and has high reactivity, and is sensitive to heat and shock, and therefore problems have remained in commercialization of the negative electrode using the lithium metal.

Then, as a negative electrode active material in place of the lithium metal, a carbon-based negative electrode that intercalates or deintercalates lithium has come to be used (Patent Literature 1).

The carbon-based negative electrode had solved the various problems of the lithium metal, and greatly contributed to the spending of the lithium ion battery. However, as mobile apparatus was gradually downsized, lightweighted, and highly advanced, increasing the capacity of the lithium ion battery appeared as an important problem.

The lithium ion battery using the carbon-based negative electrode essentially has low battery capacity due to the porous structure of carbon. For example, even in the case of the graphite having the highest crystallinity as a carbon, the theoretical capacity is 372 mAh/g in the composition of $LiC_6$. In comparison, this value is only approximately 10% of the theoretical capacity of the lithium metal of 3860 mAh/g. From the situations, regardless of the above problems, the studies for increasing the capacity of the battery by introducing metals such as the lithium into a negative electrode is actively attempted again.

As a representative, using a material containing a metal that can be alloyed with the lithium (Si, Sn and Al) as the negative electrode active material is studied. However, the material that can be alloyed with the lithium, such as Si and Sn, may expand the volume during the alloying reaction with the lithium to produce the fine powder of the metal material particles so as to reduce the contact between the metal material particles. Thereby, an active area material is produced which is electrically isolated therefrom within the electrode in some cases. Further, the material has the problems of causing desorption of the metal material particles from the electrode to increase internal resistance and reduce the capacity, resulting in reducing cycle performance, or increasing severity of electrolyte decomposition reaction by increasing the specific surface area, or the like.

In order to solve the problems of such metal material, the studies on using a metal oxide having a relatively lower coefficient of volume expansion than the metal as a raw material of the negative electrode active material.

For example, Patent Literature 2 discloses that good charge-discharge cycle properties are obtained when a silicon oxide containing silicon and oxygen and having the ratio of oxygen to silicon of 0 to 2 is used as a negative electrode active material of a lithium ion secondary battery.

Patent Literature 3 proposes a method including using a hydrogen polysilsesquioxane calcined product as a silicon oxide negative electrode active material containing the amorphous silicon oxide having a nanoporous structure.

Patent Literature 4 proposes a silicon oxide which makes up for disadvantages of a volume expansion at the time of charge-discharge and is capable of easily controlling a ratio of silicon to oxygen by forming the structures in which a core containing silicon and silicon nanoparticles formed on the surface of the core are arranged.

All the silicon oxide compounds mentioned in the above literature are the compounds having no hydrogen, but the presence of the Si—H bond is not mentioned. Therefore, the silicon oxide compounds mentioned in the above are essentially different from the silicon nanoparticle-containing hydrogen polysilsesquioxane calcined product of the present invention, which is represented by a general formula $SiO_xH_y$. The above patent literatures do not suggest the presence of the chemical bond between the silicon nanoparticle and the silicon oxide. Consequently, the structures disclosed in the patent literature described above can be determined to be also different from the silicon nanoparticle-containing hydrogen polysilsesquioxane calcined product of the present invention. When the silicon oxide compounds described above are used as a negative electrode active material for a battery, the battery properties are improved to a certain level, but one or more of discharge capacity, initial charge-discharge efficiency and capacity maintenance rate of charge-discharge cycle cannot be recognized to achieve the level which does not cause any problems. The technique could not provide any negative electrode active materials which provide balanced battery properties and cannot be subjected to highly practical use.

CITATION LIST

Patent Literature

Patent Literature 1: JP S62-90863 A
Patent Literature 2: JP 2004-71542 A
Patent Literature 3: JP 2008-171813 A
Patent Literature 4: JP 2016-514898 A

SUMMARY OF INVENTION

Technical Problem

The development of the negative electrode active material solving the problems of the conventional negative electrode material and providing the resulting battery having superior initial discharge efficiency, high capacity and excellent cycle properties and good capacity maintenance rate is still desired.

The object of the present invention are to provide new silicon oxide structure as a negative electrode active material for the secondary batteries have excellent initial discharge efficiency, high capacity, good cycle properties, and a practical capacity maintenance rate.

Solution to Problem

The present inventors have diligently continued to conduct the study toward solving the problems, and as a result, the present inventors have found that a silicon nanoparticles-containing polysilsesquioxane calcined product provides a resultant secondary battery including the calcined product having superior initial charge-discharge efficiency, high capacity, and a capacity maintenance rate, when the calcined product is used as a negative active material for a lithium ion battery.

More specifically, the present invention includes the aspects described below.

[1] A silicon nanoparticle-containing hydrogen polysilsesquioxane calcined product represented by a general formula $SiO_xH_y$ (0.01<x≤0.3, 0<y<0.35) and having a Si—H bond, wherein the silicon nanoparticle-containing hydrogen polysilsesquioxane calcined product has the following features (A) and (B):

(A) the silicon nanoparticle-containing hydrogen polysilsesquioxane calcined product contains more than 65.0% by weight of a silicon nanoparticle having a volume-basis mean particle size of more than 10 nm and less than 500 nm and having no particle having a particle size of 1000 nm or more, and (B) the silicon nanoparticle-containing hydrogen polysilsesquioxane calcined product has a silicon oxide structure derived from a hydrogen polysilsesquioxane which covers the silocone nanoparticle and is chemically bonded to a surface of the silocone nanoparticle.

[2] The silicon nanoparticle-containing hydrogen polysilsesquioxane calcined product according to [1], when an intensity of a maximum absorption peak within an absorption band of 820 to 920 $cm^{-1}$ derived from a Si—H bond is $I_1$ and an intensity of a maximum absorption peak within an absorption band of 1000 to 1250 $cm^{-1}$ derived from a Si—O—Si bond is $I_2$ in an spectrum obtained by measuring the silicon nanoparticle-containing hydrogen polysilsesquioxane calcined product by the infrared spectroscopy, an intensity ratio ($I_1/I_2$) is in a range of from 0.01 to 0.35.

[3] The silicon nanoparticle-containing hydrogen polysilsesquioxane calcined product according to [1] or [2], wherein in absorption band of 1000 to 1250 $cm^{-1}$ derived from the Si—O—Si bond, when an intensity of a maximum absorption peak in a wavelength of 1100 $cm^{-1}$ or higher is $I_{2-1}$ and an intensity of a maximum absorption peak in a wavelength of 1100 $cm^{-1}$ or lower is $I_{2-2}$ in the spectrum obtained by measuring the silicon nanoparticle-containing hydrogen polysilsesquioxane calcined product by the infrared spectroscopy, an intensity ratio ($I_{2-1}/I_{2-2}$) is greater than 1.

[4] A negative electrode active material for a lithium ion battery comprising the silicon nanoparticle-containing hydrogen polysilsesquioxane calcined product according to any one of [1] to [3].

[5] A negative electrode for a lithium ion battery comprising the negative electrode active material for a lithium ion battery according to [4].

Advantageous Effects of Invention

According to the present invention, the negative electrode active material containing the silicon nanoparticle-containing hydrogen polysilsesquioxane calcined product having new structure which is directly obtained from the calcined product obtained by heat treatment to the silicon nanoparticle-containing hydrogen polysilsesquioxane under non-oxidizing atmosphere can be provided.

The lithium ion battery obtained by using the negative electrode active material for a lithium ion battery of the present invention has excellent initial discharge efficiency and good discharge capacity and cycle properties.

DESCRIPTION OF EMBODIMENT

Figure 1:
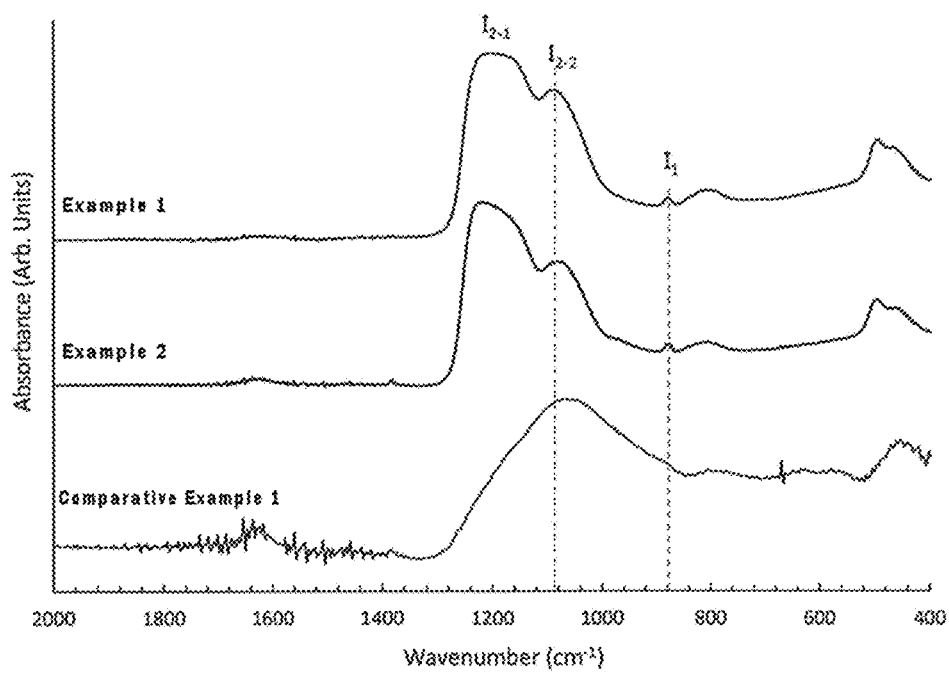
FIG. 1 is a chart of IR absorption spectra of the silicon nanoparticle-containing hydrogen polysilsesquioxane calcined product (1) obtained in Example 1, the silicon nanoparticle-containing hydrogen polysilsesquioxane calcined product (2) obtained in Example 2 and the silicon nanoparticle mix silicon oxide (1) obtained in Comparative Example 1.

Hereinafter, the present invention will be described in more detail.

The silicon nanoparticle-containing hydrogen polysilsesquioxane calcined product can be obtained by calcining the silicon nanoparticle-containing hydrogen polysilsesquioxane (a precursor of the silicon nanoparticle-containing hydrogen polysilsesquioxane calcined product). Therefore, the explanations are described in order from the silicon nanoparticle-containing hydrogen polysilsesquioxane to the silicon nanoparticle-containing hydrogen polysilsesquioxane calcined product.

<Production of Silicon Nanoparticle-Containing Hydrogen Polysilsesquioxane>

The silicon nanoparticle-containing hydrogen polysilsesquioxane can be obtained by adding silicon nanoparticles during synthesis of a hydrogen silsesquioxane polymer (HPSQ) by the hydrolysis reaction and a condensation reaction (also called polycondensed reaction) of a silicon compound represented by formula (1), but the production method is not particularly limited thereto. Specific examples include a method of conducting the hydrolysis reaction and the condensation reaction of a mixture obtained by adding silicon nanopowders to the silicon compound represented by formula (1), and a method of adding dropwise a silicon compound represented by formula (1) into a solvent in which the silicon nanopowders are dispersed and conducting the hydrolysis reaction and the condensation reaction.

$$HSi(R)_3 \qquad (1)$$

In formula (1), R is a halogen atom, a hydrogen atom or a group selected from substituted or unsubstituted alkoxy group having 1 to 10 carbons, and substituted or unsubstituted aryloxy group having 6 to 20 carbons, R may be identical to or different from each other, provided that in substituted or unsubstituted alkoxy group having 1 to 10 carbons, and substituted or unsubstituted aryloxy group having 6 to 20 carbons, an hydrogen atom may be optionally replaced with a halogen atom.

The silicon compound represented by a formula (1) includes the following compounds described below.

Examples include trihalogenated silane or dihalogenated silane such as trichlorosilane, trifluorosilane, tribromosilane and dichlorosilane; trialkoxysilane and dialkoxysilane such as tri-n-butoxysilane, tri-t-butoxysilane, tri-n-propoxysilane, tri-i-propoxysilane, di-n-butoxyethoxysilane, triethoxysilane, trimethoxysilane and diethoxysilane; and aryloxysilane and aryloxyalkoxysilane such as triaryloxysilane, diaryloxysilane and diaryloxyethoxysilane.

Among the above compounds, from the viewpoints of reactivity, ease of availability and production cost, trihalogenated silane or trialkoxysilane are preferred, and trihalogenated silane is particularly preferred.

The silicon compounds represented by formula (1) may be used alone, or two or more kinds of the silicon compounds may be mixed and used.

The silicon compound represented by formula (1) has high hydrolyzability and condensation reactivity, and therefore, by using the silicon compound, the silicon nanoparticle-containing hydrogen polysilsesquioxane can be easily obtained. In addition, the silicon compound represented by formula (1) also has an advantage that an amount of the Si—H bond in the silicon nanoparticle-containing hydrogen polysilsesquioxane calcined product can be easily controlled by heat treatment to the silicon nanoparticle-containing hydrogen polysilsesquioxane under the non-oxidizing atmosphere.

Next, the hydrolysis reaction and the polycondensation reaction of the mixture obtained by adding the silicon nanoparticles to the silicon compound represented by formula (1) will be described.

The hydrolysis reaction can be performed by a conventional method, for example, the hydrolysis reaction can be performed in a solvent such as an alcohol or DMF in the presence of an inorganic acid such as hydrochloric acid or an organic acid such as acetic acid and water at the ordinary temperature or under heating. Accordingly, the reaction mixture after the hydrolysis reaction may contain a solvent, an acid, water, and a material derived therefrom, in addition to the hydrolysate of the silicon compound represented by formula (1).

In the reaction mixture after the hydrolysis reaction, the silicon compound represented by formula (1) is not necessary to be completely hydrolyzed, and the part of the silicon compound may remain.

In addition, the polycondensation reaction of the hydrolysate also partially progresses in addition to the hydrolysis reaction.

A progress degree of the polycondensation reaction can be controlled by hydrolysis temperature, hydrolysis time, acidity and/or solvent or the like, and for example, can be appropriately set according to the object silicon nanoparticle-containing hydrogen polysilsesquioxane as described later.

In consideration of the productivity and the production cost thereof, a method in which the hydrolysis reaction and the condensation reaction are concurrently carried out under identical conditions in one reactor is preferred.

As reaction conditions, the silicon compound represented by formula (1) is added to an acidic aqueous solution under stirring, and is allowed to react at a temperature of −20 to 50° C., preferably 0 to 40° C., and particularly preferably 10 to 30° C., for 0.5 to 20 hours, preferably for 1 to 10 hours, and particularly preferably for 1 to 5 hours.

The acidity of the hydrolysis solution is preferably adjusted ordinarily to pH 7 or less, and more preferably to pH 6 or less, and further preferably pH 3 or less. As an acid used for pH adjustment, any of the organic acid and the inorganic acid can be used.

Specific examples of the organic acid include formic acid, acetic acid, propionic acid, oxalic acid and citric acid, and specific examples of the inorganic acid include hydrochloric acid, sulfuric acid, nitric acid and phosphoric acid. Among the above acids, hydrochloric acid and acetic acid are preferred in view of easily controlling the hydrolysis reaction and the subsequent polycondensation reaction, and the ease of availability, the pH adjustment and the treatment after the reaction.

When a halogenated silane such as trichlorosilane is used as the silicon compound represented by formula (1), the acidic aqueous solution is formed in the presence of water, and therefore an acid is not necessary to be added separately, which is one of preferred aspects of the present invention.

The silicon nanoparticle-containing hydrogen polysilsesquioxane which is a precursor of the silicon nanoparticle-containing hydrogen polysilsesquioxane calcined product can be obtained by conducting the hydrolysis reaction and the polycondensation reaction of the compound represented by formula (1) in the coexistence of the silicon nanoparticles. The silicon nanoparticles to be used are not particularly limited as long as a volume-basis mean particle size thereof is more than 10 nm and less than 500 nm. As for the lower limit of volume-basis mean particle size, more than 20 nm is preferable, and more than 30 nm is further preferable. As for the upper limit of volume-basis mean particle size, less than 300 nm is preferable, and less than 200 nm is further preferable. The silicon nanopowder or the like is preferably used as the silicon nanoparticles. The durability of the resultant negative electrode tends to easily deteriorate while the initial electric discharge efficiency is higher, when a large quantity of silicon nanoparticles is used. However, the use of the microparticulated silicon nanoparticles can suppress the deterioration in durability. Therefore, the silicon nanoparticles which do not include any particle having a particle size of 1000 nm or more is preferable to use.

The silicon nanoparticles may contain another component than silicon, for example carbons and metals, etc., within the range that the advantageous effects of the present invention are not adversely affected. The content thereof is ordinarily less than 5% by weight to the silicon nanoparticles. The silicon nanoparticles which essentially do not include any carbon or any metal can be used.

The volume-basis mean particle size herein means a particle size calculated by the volume basis, and may be occasionally referred to simply as a mean particle size.

The silicon nanoparticles are usually added for the content to exceed 65% by weight based on the silicon nanoparticle-containing hydrogen polysilsesquioxane calcined product to be obtained. By the addition to satisfy the above range, the initial charge-discharge efficiency can be very enhanced. The upper limit of the blending amount of silicon nanoparticles is not limited, but 95% by weight or less are preferable, and 90% by weight or less are more preferable.

After the completion of the hydrolysis reaction and the polycondensation reaction, a liquid portion is separated and removed by a conventional method such as filtration separation, centrifugal separation or decantation. In some cases, the resulting material is further washed with water or an organic solvent, and then dried, and thus silicon nanoparticle-containing hydrogen polysilsesquioxane of the present invention can be obtained.

<Structure of Silicon Nanoparticle-Containing Hydrogen Polysilsesquioxane>

The silicon nanoparticle-containing hydrogen polysilsesquioxane has features that in an intensity ratio ($I_{2-1}/I_{2-2}$) is greater than 1, within an absorption bands in 1000 to 1250 $cm^{-1}$ derived from the Si—O—Si bond, when an intensity of a maximum absorption peak (peak 2-1) in a wavelength of 1100 $cm^{-1}$ or higher is $I_{2-1}$ and an intensity of a maximum absorption peak (peak 2-2) in a wavelength of 1100 $cm^{-1}$ or lower is $I_{2-2}$ in the spectrum obtained by measurement with the infrared spectroscopy. The peak intensity ratio of greater than 1 indicates that the silicon nanoparticle-containing hydrogen polysilsesquioxane has a chemical bond between the silicon nanoparticles existing therein and the hydrogen polysilsesquioxane, and the particle disintegration caused by the expansion and contraction of the silicon particles during the charge-discharge cycle is expected to be suppressed by the presence of the chemical bond.

An absorption band in 1000 to 1250 $cm^{-1}$ in an IR spectrum of the hydrogen polysilsesquioxane is derived from the asymmetric stretching vibration of the Si—O—Si bond. In the case of a straight-chain bond, multiple peaks of absorption are generally observed in 1000 to 1250 $cm^{-1}$, and in the case of a cyclic bond, one peak of absorption is generally observed in 1000 to 1100 $cm^{-1}$. In the IR spectrum of the silicon nanoparticle-containing hydrogen polysilsesquioxane, the absorption peak in a wave length of 1100 $cm^{-1}$ or higher is attributed to be derived from the straight-chain bond of siloxane, and the absorption peak in a wavelength of 1100 $cm^{-1}$ or lower is attributed to be derived from both the straight-chain bond and the cyclic bond of siloxane. When the silicon compound represented by formula (1) is subjected to the hydrolysis reaction and the condensation reaction alone without the coexistence of the silicon nanoparticles, the energy of a system is expected to be further reduced by the reaction of the polymer terminals with each other to form a cyclic siloxane rather than the reaction of the polymer terminal with a monomer to form a straight-chain siloxane. Accordingly, the results that peak 2-2 is larger than peak 2-1 can be easily predicted.

Meanwhile, the hydrolysis-polymerization of the silicon compound represented by formula (1) progresses in the coexistence of the silicon nanoparticles, and therefore if a terminal portion of a chain Si—O—Si structure included in the HPSQ polymer to be formed reacts with the silanol structure on a surface of the silicon nanoparticles, the polymerization is terminated at the terminal portion, and the chain Si—O—Si structure is kept. As a result, the formation of the cyclic Si—O—Si structure is conceivably suppressed in comparison with the case of the reaction of the silicon compound represented by formula (1) alone. Further, with regard to the above ratio, the ratio of the cyclized bond is almost maintained even after heat treatment. Therefore, the state of $I_{2-1}/I_{2-2} > 1$ is also maintained even after the calcination.

Thus, in the silicon nanoparticle-containing hydrogen polysilsesquioxane, the silicon nanoparticles and the hydrogen polysilsesquioxane form a network through the strong chemical bond (Si—O—Si bond). The network is maintained even after the calcination, and the hydrogen polysilsesquioxane structure plays a role of a buffer layer against the expansion and contraction of the silicon nanoparticles, and as a result, the pulverization of the silicon nanoparticles caused during repetition of the charge-discharge is expected to be suppressed.

Because the primary particles are small, when the calcined product of the silicon nanoparticle-containing hydrogen polysilsesquioxane is used as the negative electrode material for the lithium ion battery, the stress during the expansion and contraction caused during repetition of the charge-discharge is relaxed. Accordingly, the cycle deterioration is suppressed to be effective in improving cycle performance. Moreover, the silicon nanoparticle-containing hydrogen polysilsesquioxane has a complicated secondary aggregation structure, resulting in favorable binding properties with the binder to develop further excellent cycle performance.

Next, the silicon nanoparticle-containing hydrogen polysilsesquioxane calcined product obtained by calcining the silicon nanoparticle-containing hydrogen polysilsesquioxane will be described.

<Production of Silicon Nanoparticle-Containing Hydrogen Polysilsesquioxane Calcined Product>

The silicon nanoparticle-containing hydrogen polysilsesquioxane calcined product is obtained by heat-treatment to the silicon nanoparticle-containing hydrogen polysilsesquioxane obtained under the non-oxidizing atmosphere by the method described above. The term "non-oxidizing" herein literally means that the silicon nanoparticle-containing hydrogen polysilsesquioxane is not oxidized, but substantially "non-oxidizing" involves the state that the formation of silicon dioxide is suppressed to a degree at which the advantageous effects of the present invention are not adversely affected upon heat treatment (More specifically, a value of $I_1/I_2$ may be adjusted within a numerical range specified in the present invention.). Accordingly, with regard to a state of "non-oxidizing" means that oxygen is removed so that the object can be achieved. In the specification, $I_1$ means an intensity of a maximum absorption peak (peak 1) in an absorption band of 820 to 920 $cm^{-1}$ derived from the Si—H bond. When the composition of the silicon nanoparticle-containing hydrogen polysilsesquioxane calcined product thus obtained is measured by elemental analysis, the silicon nanoparticle-containing hydrogen polysilsesquioxane calcined product of the present invention contains a silicon atom (Si), an oxygen atom (O) and a hydrogen atom (H), is represented by general formula $SiO_xH_y$ ($0.01<x\leq0.3$, $0<y<0.35$).

If x is in the range of $0.01<x\leq0.3$, and preferably in the range of $0.05<x\leq0.3$ in the calcined product, the negative electrode active material having greatly excellent initial charge-discharge efficiency, good battery capacity and good cycle capacity maintenance rate can be obtained. If y is in the range of $0<y<0.35$, and preferably in the range of $0.01<y<0.35$ in the calcined product, the resulting secondary battery has good cycle performance with excellent charge-discharge capacity and improved capacity maintenance rate.

In addition, as for the silicon nanoparticle-containing hydrogen polysilsesquioxane calcined product, in the spectrum measured by the infrared spectroscopy, when the intensity of the maximum absorption peak (peak 1) in the absorption band of 820 to 920 $cm^{-1}$ derived from the Si—H bond is $I_1$, and the intensity of the maximum absorption peak (peak 2) in the absorption band of 1000 to 1250 $cm^{-1}$ derived from the Si—O—Si bond is $I_2$, the intensity ratio ($I_1/I_2$) is preferably in the range of 0.01 to 0.35.

The ratio ($I_1/I_2$) of the intensity of peak 1 ($I_1$) and the intensity of peak 2 ($I_2$) is preferably in the range of 0.01 to 0.35, more preferably in the range of 0.01 to 0.30, and further preferably in the range of 0.03 to 0.20. By the presence of a suitable amount of the Si—H bond, high discharge capacity, good initial charge-discharge efficiency and good cycle performance can be provided, when the calcined product is used as a negative electrode active material for the lithium ion battery.

As for the silicon nanoparticle-containing hydrogen polysilsesquioxane calcined product, in the spectrum measured by the infrared spectroscopy, within the absorption band in 1000 to 1250 $cm^{-1}$ derived from Si—O—Si bond, when an intensity of a maximum absorption peak (peak 2-1) in a wavelength of 1100 $cm^{-1}$ or higher is $I_{2-1}$ and an intensity of a maximum absorption peak (peak 2-2) in a wavelength of 1100 $cm^{-1}$ or lower is $I_{2-2}$, the intensity ratio ($I_{2-1}/I_{2-2}$) of the silicon nanoparticle-containing hydrogen polysilsesquioxane calcined product is preferably greater than 1. The peak intensity ratio of greater than 1 indicates that the silicon nanoparticle-containing hydrogen polysilsesquioxane calcined product has a chemical bond between the silicon nanoparticles existing therein and the silicon oxide structure derived from the hydrogen polysilsesquioxane, and a particle disintegration caused by the expansion and contraction of the silicon nanoparticles during the charge-discharge cycle is expected to be suppressed by the presence of the chemical bond.

As described above, heat treatment to the silicon nanoparticle-containing hydrogen polysilsesquioxane is preferably carried out under the non-oxidizing atmosphere. If heat treatment is carried out in the atmosphere in which oxygen exists, a silicon dioxide is formed, thereby being difficult to obtain a desired composition and a desired Si—H bonding amount.

As the non-oxidizing atmosphere includes inert gas atmosphere, the atmosphere in which oxygen is removed by high vacuum (The atmosphere is not limited to as long as oxygen is removed to a degree not suppressing the formation of the objective silicon nanoparticle-containing hydrogen polysilsesquioxane calcined product.), the reduced atmosphere and the atmosphere combination of the above atmospheres. Specific examples of inert gas include nitrogen, argon and helium. The above inert gas can be used without any problems, if inert gas is in a high purity grade generally used. Moreover, the atmosphere in which oxygen is removed by high vacuum without using inert gas may be applied. The reduced atmosphere involves the atmosphere containing reduced gas such as hydrogen. Specific examples include a mixed gas atmosphere of 2% by volume or more of hydrogen gas and inert gas. In addition, as reduced gas, a hydrogen gas atmosphere can also be used.

The silicon nanoparticle-containing hydrogen polysilsesquioxane is heat-treated under the non-oxidizing atmosphere, thereby causing start of dehydrogenation of the Si—H bond from about 600° C. to form the Si—Si bond, and a distinctive silicon oxide structure derived from hydrogen polysilsesquioxane is formed. Even if the above heat treatment is carried out, the chemical bond between the silicon nanoparticles and hydrogen polysilsesquioxane is kept. The presence of the silicon oxide structure derived from the hydrogen polysilsesquioxane after heat treatment can be found by measurement by the infrared spectroscopy, etc. described later. If the Si—Si bond is moderately grown, the Si—Si bond is formed into excellent Li insertion site to serve as a source of a high charging capacity. Meanwhile, the Si—H bond interacts with a binder having a functional group such as a $COO^-$ group, being a conventional battery material component, to form a flexible and strong bond, and therefore when the battery is formed, the good cycle performance is developed.

Accordingly, a suitable amount of the Si—H bond is required to remain in order to develop both high capacity and good cycle performance. Heat treatment temperature satisfying such conditions is ordinarily 600° C. to 1000° C., and preferably 750 to 900° C. If the temperature is less than 600° C., the amount of Si—H bond is excessively large, and discharge capacity is not sufficient. If the temperature is more than 1000° C., the Si—H bonds disappear, and therefore good cycle performance are unable to be obtained.

Heat treatment time is not particularly limited, but is ordinarily 15 minutes to 10 hours, and preferably 30 minutes to 5 hours.

The silicon nanoparticle-containing hydrogen polysilsesquioxane calcined product is obtained by heat treatment described above, in which heat treatment conditions may be appropriately selected to fall within the range of $SiO_xH_y$ ($0.01<x\leq0.3$, $0<y<0.35$) in results of the elemental analysis already described, and within the range of 0.01 to 0.35 in the ratio ($I_1/I_2$) of intensity ($I_1$) of peak 1 to intensity ($I_2$) of peak 2 by the infrared spectroscopy.

The thus obtained silicon nanoparticle-containing hydrogen polysilsesquioxane calcined product of the present invention is obtained by heat treatment to silicon nanoparticle-containing hydrogen polysilsesquioxane obtained by the synthetic method of the present invention. Thus, as is evident from the photograph of the scanning electron microscope (SEM) the shape thereof is formed of a secondary aggregate formed by further aggregating primary particles being spherical particles having particle size of submicron order.

Because the primary particles are small, when the silicon nanoparticle-containing hydrogen polysilsesquioxane calcined product is used as the negative electrode material for the lithium ion battery, stress during the expansion and contraction caused during repetition of the charge-discharge is relaxed. Accordingly, the cycle deterioration is suppressed to be effective in improving cycle performance. Moreover, because of a complicated secondary aggregation structure, binding properties with a binder are improved to provide further excellent cycle performance.

<Negative Electrode Active Material Including Silicon Nanoparticle-Containing Hydrogen Polysilsesquioxane Calcined Product>

Next, the negative electrode active material including the silicon nanoparticle-containing hydrogen polysilsesquioxane calcined product will be described.

For achieving a battery having the high capacity, a large amount of current is essential to be charged and discharged, and therefore a material having low electric resistance is demanded in an electrode.

Accordingly, complexing or covering the silicon nanoparticle-containing hydrogen polysilsesquioxane calcined product with a carbon-based material is also an aspect of the present invention.

In order to complexing or covering the calcined product with the carbon-based material, a method of dispersing the carbon-based material with the silicon nanoparticle-containing hydrogen polysilsesquioxane calcined product by a mechanical mixing method using mechanofusion or a ball mill and a vibrating mill or the like.

Specific examples of the carbon-based material preferably include a carbon-based material such as graphite, carbon black, fullerene, carbon nanotube, carbon nanofoam, pitch carbon fibers, polyacrylonitrile carbon fiber and amorphous carbon.

The silicon nanoparticle-containing hydrogen polysilsesquioxane calcined product and the carbon-based material can be complexed or covered at an arbitrary proportion.

<Negative Electrode>

The negative electrode in a lithium ion secondary battery is produced using the negative electrode active material containing the silicon nanoparticle-containing hydrogen polysilsesquioxane calcined product or the silicon nanoparticle-containing hydrogen polysilsesquioxane calcined product in which the carbon-based material is complexed or covered.

As a negative electrode, for example, the silicon nanoparticle-containing hydrogen polysilsesquioxane calcined product-metal oxide complex or the negative electrode active material containing the silicon nanoparticle-containing hydrogen polysilsesquioxane calcined product with which is complexed or covered, and a negative electrode mixture containing the binder may be shaped into a predetermined form, and the negative electrode may be produced by a method of applying the negative electrode mixed material to a current collector such as copper foil. A method for forming a negative electrode is not particularly limited, and a conventional method can be used.

More specifically, for example, a negative electrode plate is obtained by a method of preparing a negative electrode material composition containing the negative electrode active material containing the silicon nanoparticle-containing hydrogen polysilsesquioxane calcined product, or the silicon nanoparticle-containing hydrogen polysilsesquioxane calcined product complexed with the carbon-based material, the binder, and when necessary, conductive material etc., and then directly covering the resulting material on the current collector in a rod-shaped body, a plate-shaped body, a foil-shaped body, a net-shaped body etc. mainly containing copper, nickel, stainless steel etc., or separately casting the negative electrode material composition on a support and laminating a negative electrode active material film peeled from the support on the current collector. Moreover, the negative electrode of the present invention is not limited to the forms cited above, and can also be obtained in a form other than the forms cited above.

As a binder, any binder can be used in the present invention as long as the binder can be generally used in a secondary battery and has a functional group such as the $COO^-$ group having interaction with the Si—H bond on the negative electrode active material. Specific examples thereof include carboxymethyl cellulose, polyacrylic acid, alginic acid, glucomannan, amylose, saccharose, derivative or polymer thereof, alkali metal salt thereof, and polyimide resin and polyimideamide resin. The binder may be used alone, or in the form of a mixture thereof. Furthermore, a component providing another function, for example, improvement in binding properties with a current collector, improvement in dispersibility and improvement in conductivity of the binder itself, for examples, a styrene-butadiene rubber-based polymer or a styrene-isoprene rubber-based polymer, which may be added and mixed.

<Lithium Ion Battery>

A lithium ion battery using the negative electrode active material formed by containing the silicon nanoparticle-containing hydrogen polysilsesquioxane calcined product of the present invention can be produced as follows.

First, a positive electrode active material that can reversibly insert and remove a lithium ion, a conductive agent, a binder and a solvent are mixed to prepare a positive electrode active material composition. In the manner similar to the negative electrode, according to a publicly known method, the positive electrode active material composition is directly coated on a metal current collector and dried to produce a positive plate.

A positive electrode can also be produced by separately casting the positive electrode active material composition on the support, and then laminating the film peeled from the support on the metal current collector. A method for shaping the positive electrode is not particularly limited, and a conventional method can be used.

The positive electrode active material is not particularly limited as long as the material is a lithium metal complex oxide, and is generally used in a field of the secondary battery. Specific examples include lithium cobalt oxide, lithium nickel oxide, lithium manganese oxide having a spinel structure, a lithium cobalt manganese oxide, an iron phosphate having an olivine structure, so-called a ternary lithium metal complex oxide and a nickel lithium metal complex oxide. Moreover, $V_2O_5$, TiS, MoS and the like which are compounds allowing desorption and insertion of the lithium ion, can also be used.

A conductive agent is not particularly limited and any conductive agent may be used, as long as the agent is an electron conductive material generally used in a lithium ion battery and does not decompose or deteriorate in the configured battery. Specific examples include carbon black such as acetylene black, graphite fine particles, vapor phase epitaxial carbon fibers and a combination of two or more thereof. Moreover, specific examples of the binder include vinylidene fluoride-hexafluoropropylene copolymer, polyvinylidene fluoride (PVDF), polyacrylonitrile, polymethylmethacrylate, polytetrafluoroethylene and mixture thereof, and styrene-butadiene rubber polymer, but the binder is not limited thereto. In addition, specific examples of the solvent include N-methyl pyrrolidone, acetone and water, but the solvent is not limited thereto.

The contents of the positive electrode active material, the conductive agent, the binder and the solvent are amounts which can be generally used in the lithium ion battery.

A separator interposed between the positive electrode and the negative electrode is not particularly limited, as long as the separator is generally used in the lithium ion battery. The separator having low resistance to ion transfer of an electrolyte, or excellent electrolyte impregnation ability is preferred. Specific examples include a material selected from glass fibers, polyester, polyethylene, polypropylene, polytetrafluoroethylene, polyimide or a compound thereof, and the material may be in the form of a nonwoven fabric or a woven fabric.

As the electrolyte, one or a mixture of two or more of electrolytes including lithium salt such as lithium hexafluorophosphate, lithium tetrafluoroborate, lithium hexaantimony, lithium hexafluoroarsenate, lithium perchlorate, lithium trifluoromethanesulfonate, $Li(CF_3SO_2)_2N$, $LiC_4F_9SO_3$, $LiSbF_6$, $LiAlO_4$, $LiAlCl_4$, $LiN(C_xF2_{x+1}SO_2)$ $(C_yF2_{y+1}SO_2)$ (wherein, x and y are a natural number), LiCl and LiI dissolved in a solvent such as propylene carbonate, aethylene carbonate, dimethyl carbonate, diethyl carbonate, ethylmethyl carbonate, methylpropyl carbonate, butylene carbonate, dibutyl carbonate, benzonitrile, acetonitrile, tetrahydrofuran, a 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene or diethyl ether or a mix solvent thereof can be used.

Moreover, various nonaqueous electrolytes other than the above or solid electrolytes can also be used. For example, various ionic liquids to which a lithium ion is added, a pseudo solid electrolyte in which the ionic liquid and fine powder are mixed, a lithium ion conductive solid electrolyte, or the like can be used.

Furthermore, for the purpose of improving charge-discharge cycle performance, a compound that promotes stable film formation on a surface of the negative electrode active material can be appropriately contained in the electrolyte described above. For example, vinylene carbonate (VC), fluorobenzene, fluorinated carbonate such as cyclic fluorinated carbonate (such as fluoroethylene carbonate (FEC), trifluoropropylene carbonate (TFPC) etc.) and chain fluorinated carbonate (such as trifluorodimethyl carbonate (TFDMC), trifluorodiethyl carbonate (TFDEC) and trifluoroethylmethyl carbonate (TFEMC) etc.) are effective. In addition, cyclic fluorinated carbonate and chain fluorinated carbonate can also be used as a solvent, such as an ethylene carbonate.

A separator is disposed between a positive electrode plate and a negative electrode plate as described above to form a battery structure. If such a battery structure is wound or folded and then incorporated into a cylindrical battery case or a square battery case. After that, the electrolyte is injected thereto, and the lithium ion battery is completed.

After the battery structures are laminated into a bicell structure, the resulting material is impregnated into an organic electrolyte, and the thus obtained material is put into a pouch and sealed, and then the lithium ion polymer battery is completed.

In one aspect of the silicon nanoparticle-containing hydrogen polysilsesquioxane calcined product formed by heat treatment to the silicon nanoparticle-containing hydrogen polysilsesquioxane, the silicon nanoparticle-containing hydrogen polysilsesquioxane calcined product has features that when an intensity of peak 1 is $I_1$ and the intensity of peak 2 is $I_2$ in an spectrum obtained by measurement by the infrared spectroscopy, the intensity ratio ($I_1/I_2$) is in the range of from 0.01 to 0.35, and having a general formula $SiO_xH_y$ (0.01<x≤0.3, 0<y<0.35) as shown in an elemental analysis of Table 1. The lithium ion battery produced by using the negative electrode active material containing the silicon nanoparticle-containing hydrogen polysilsesquioxane calcined product having the above features has greatly excellent initial charge-discharge efficiency and good high capacity and provides good cycle properties.

In one aspect of the silicon nanoparticle-containing hydrogen polysilsesquioxane calcined product of the present invention, the silicon nanoparticle-containing hydrogen polysilsesquioxane calcined product has features that when the intensity of peak 2-1 is $I_{2-1}$ and an intensity of peak 2-2 is $I_{2-2}$ in the spectrum obtained by measurement by the infrared spectroscopy, the intensity ratio ($I_{2-1}/I_{2-2}$) is greater than 1. The above features are the same as the features of the silicon nanoparticle-containing hydrogen polysilsesquioxane which is a precursor. The proportion of cyclization bond is substantially maintained after heat treatment is conducted, and therefore, the status of $I_{2-1}/I_{2-2}>1$ is also maintained.

In such a silicon nanoparticle-containing hydrogen polysilsesquioxane calcined product, the surface of the silicon nanoparticles and the silicon oxide structure (derived from a hydrogen polysilsesquioxane) form a network through the strong chemical bond (the Si—O—Si bond) are indicated. The network is held even after the calcination, and a structure of the silicon oxide structure part plays a role of a buffer layer against the expansion and contraction of the silicon nanoparticles, and as a result, pulverization of the silicon nanoparticles caused by repeating the charge-discharge is expected to be suppressed.

EXAMPLES

Hereinafter, the present invention will be described more specifically by describing the Examples and the Comparative Examples, but the present invention is not limited to the Examples.

Various analyses and evaluations were conducted on some silicon nanoparticle-containing hydrogen polysilsesquioxane calcined products, etc., prepared in Examples and Comparative Examples.

Measuring devices and measuring methods used in "Measurement by Infrared Spectroscopy", "Measurement by Elemental Analysis" and "Evaluation of Battery Properties" in the Examples and the Comparative Examples are as described below.

(Measurement by Infrared Spectroscopy)

With regard to measurement by the infrared spectroscopy, the measurement was carried out by using a Nicolet iS5 FT-IR made by Thermo Fisher Scientific K.K. as an infrared spectrometer, in measurement of transmission by a KBr method (resolution: 4 cm$^{-1}$, the number of times of scans: 16 times, data interval: 1.928 cm$^{-1}$, detector: DIGS KBr) on an intensity ($I_1$) of peak 1 in 820 to 920 cm$^{-1}$ derived from the Si—H bond and an intensity ($I_2$) of peak 2 in 1000 to 1250 cm$^{-1}$ derived from the Si—O—Si bond. In addition, each peak intensity was determined by connecting the starting point and the end point of a target peak by a straight line, partially correcting a baseline, and then measuring a height from the baseline to a peak top. Peaks derived from the Si—O—Si bond existed in two places, and therefore the peaks were separated, and the intensity of the peak at about 1170 cm$^{-1}$ was specified as $I_{2-1}$, and the intensity of the peak at about 1070 cm$^{-1}$ was specified as $I_{2-2}$, and the intensity of the peak having higher intensity of the two peaks was specified as $I_2$.

(Measurement by Elemental Analysis)

The elemental composition analysis was conducted by compacting sample powder into a pellet form, and then irradiating the sample with the helium ion accelerated to 2.3 MeV and applying a Rutherford back scattering spectrometry (RBS)-hydrogen forward scattering spectrometry (HFS) method by which a high-accuracy composition value including a hydrogen is obtained by analyzing an energy spectrum of back scattered particles and an energy spectrum of a forward scattered hydrogen atom. The measurement was carried out under the conditions of incident ion: 2.3 MeV He, incident angle during RBS/HFS simultaneous measurement: 75 degrees, scattering angle: 160 degrees, sample current: 4 nA and beam diameter: 2 mmφ by using a measuring device, Pelletron 3SDH made by National Electrostatics Corporation.

(Observation by Scanning Electron Microscope (SEM))

Sample powder was observed and photographed by a ultra-high resolution analytical scanning electron microscope (Hitachi Ltd., Product name: SU-70).

(Evaluation of Battery Properties)

Charge-discharge properties etc. of the lithium ion secondary battery using the negative electrode active material containing the silicon nanoparticle-containing hydrogen polysilsesquioxane calcined product were measured as described below.

By using a BTS 2005W made by NAGANO & Co., Ltd., the constant current charge was carried out on a Li electrode at a current of 100 mA per 1 g weight of the silicon nanoparticle-containing hydrogen polysilsesquioxane calcined product to reach a voltage of 0.001 V and then the constant voltage charge was carried out by maintaining a voltage of 0.001 V to reach a current value equal to or less than 20 mA per 1 g of the active material.

After a rest period of about 30 minutes, on the completely charged cell, the constant current discharge was carried out at a current of 100 mA per 1 g of the active material to reach a voltage of 1.5 V.

The charge capacity was calculated from an integral current value until the constant voltage charge was ended, and the discharge capacity was calculated from an integral current value until a battery voltage reached 1.5 V. At the time of switching the charge-discharge, the conditions of an open circuit were kept for 30 minutes.

Charge-discharge cycle performance was also measured under the same conditions.

The charge-discharge efficiency was taken as a ratio of the discharge capacity to the first charge capacity (the first cycle of the charge-discharge), and capacity maintenance rate was taken as a ratio of discharge capacity at the 50th cycle of the charge-discharge to the first discharge capacity.

Example 1

(Preparation of Silicon Nanoparticle-Containing Hydrogen Polysilsesquioxane (1))

In a 100 mL poly beaker, 50 g of pure water and 13.6 g of silicon nanopowder (Nanomakers, Pure Si NM Si99, average particle size of 75 nm; Particles having a particle size of 1000 nm or more are not contained.) were put, and then treated by using an ultrasonic homogenizer for 2 minutes to prepare aqueous silicon nanoparticle dispersion. Into a 500 mL three-neck flask, the aqueous silicon dispersion, 2.22 g (21 mmol) of 35% by weight concentration hydrochloric acid and 161 g of pure water were added thereinto, the silicon nanoparticles were dispersed into whole aqueous solution with stirring at room temperature for 10 minutes, and 19.9 g (121 mmol) of a triethoxysilane (Tokyo Chemical Industry Co., Ltd.) was added dropwise thereto at 25° C. under stirring. After completion of drop-wise addition, the hydrolysis reaction and the condensation reaction were carried out at 25° C. for 2 hours while the mixture was stirred.

After elapse of the reaction time, reaction products were filtrated by a membrane filter (pore size: 0.45 μm, hydrophilic) to collect a solid. The solid obtained was dried under reduced pressure at 80° C. for 10 hours to obtain 20.0 g of a silicon nanoparticle-containing hydrogen polysilsesquioxane powder (1).

(Preparation of Silicon Nanoparticle-Containing Hydrogen Polysilsesquioxane Calcined Product (1))

On an alumina boat of an SSA-S grade, 10.0 g of the silicon nanoparticle-containing hydrogen polysilsesquioxane powder (1) was placed, and then the boat was set in a vacuum purging tube furnace KTF43N1-VPS (Koyo Thermo Systems Co., Ltd.). Then, as heat treatment conditions, while argon gas was fed at a flow rate of 250 mL per minute under the argon gas atmosphere (high-purity argon gas: 99.999%), and the temperature was raised at a rate of 4° C. per minute, and calcination was carried out at 900° C. for 1 hour to obtain a silicon nanoparticle-containing hydrogen polysilsesquioxane calcined product.

Then, the silicon nanoparticle-containing hydrogen polysilsesquioxane calcined product was ground and crushed with a mortar for 5 minutes, and the resulting material was classified using a stainless steel sieve having an opening of 32 μm to obtain 9.78 g of a silicon nanoparticle-containing hydrogen polysilsesquioxane calcined product (1) having a maximum particle size of 32 μm.

Figure 2:
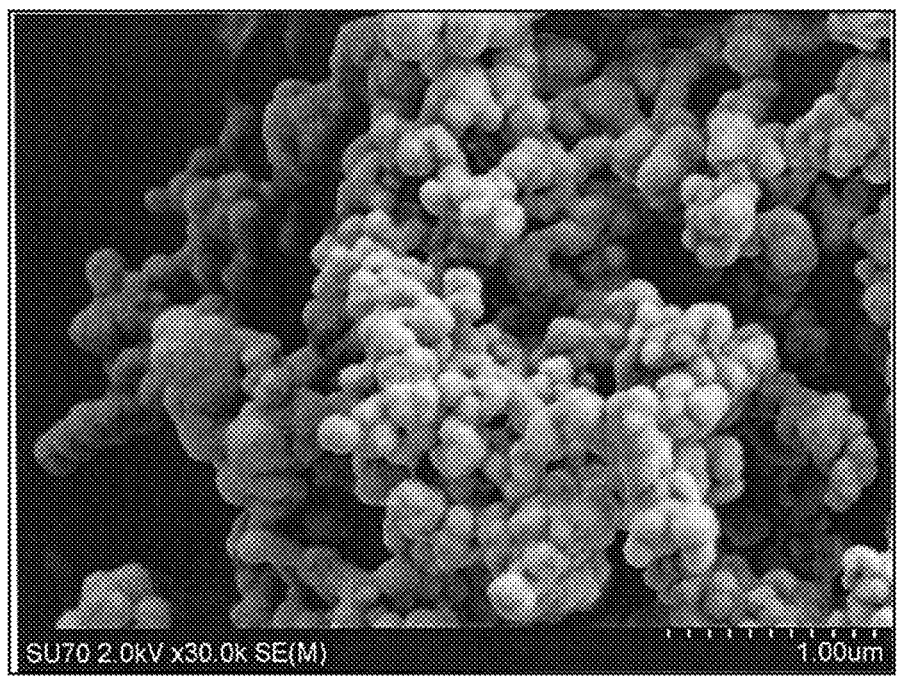
FIG. 2 shows a photograph of a scanning electron microscope (SEM) of the silicon nanoparticle-containing hydrogen polysilsesquioxane calcined product (1) obtained in Example 1.

The infrared spectrum and the electron microscope (SEM) photograph of the resultant silicon nanoparticle-containing hydrogen polysilsesquioxane calcined product (1) are shown in FIGS. 1 and 2, respectively (The silicon nanoparticle-containing hydrogen polysilsesquioxane calcined product (1) is shown as "Example 1" in FIG. 1).

(Preparation of Negative Electrode)

To 20 g of a 2% by weight carboxymethyl cellulose aqueous solution, 3.0 g of the silicon nanoparticle-containing hydrogen polysilsesquioxane calcined product (1), 0.4 g of acetylene black made by Denka Company Limited, and 0.2 g of vapor phase carbon fiber (vapor-phase growth carbon fiber) (Showa Denko K.K.) VGCF-H were added and mixed for 15 minutes using a stirrer in the flask, and then distilled water was added so as for the solid content concentration to be 15% by weight, and the resultant mixture was further stirred for 15 minutes to prepare a slurry composition. The slurry composition was transferred to a thin-film spin system high-speed mixer (FILMIX Model 40-40) made by PRIMIX Corporation, and was stirred and dispersed at a rotation speed of 20 m/s for 30 seconds. The slurry obtained after the dispersion treatment was coated on a copper foil roll at a thickness of 200 μm by a doctor blade method.

After coating, the resultant material was dried for 90 minutes on a hot plate at 80° C. After drying, a negative electrode sheet was pressed by a 2-ton small precision roll press (THANK-METAL Co., LTD.). After the press, the electrode sheet was punched with an electrode punch HSNG-EP having φ14.50 mm, and then was dried under a reduced pressure at 80° C. for 16 hours in a glass tube oven GTO-200 (SIBATA SCIENTIFIC TECHNOLOGY LTD.) to manufacture a negative electrode.

(Production and Evaluation of Lithium Ion Battery)

Figure 3:
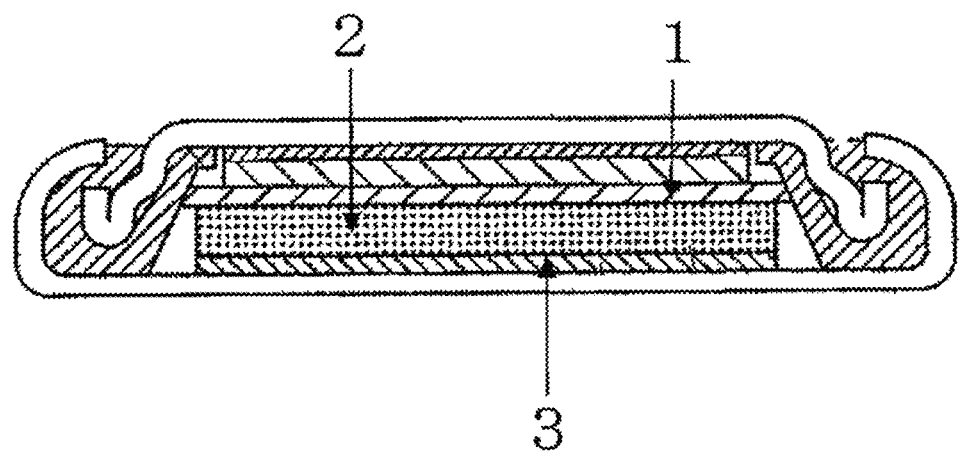
FIG. 3 is a diagram showing a configuration example of a coin-type lithium ion cell.

A 2032 type coin cell having a structure shown in FIG. 3 was produced. The negative electrode obtained above were used as negative electrode 1, a lithium metal was used as counter electrode 3, a microporous polypropylene film was used as separator 2, respectively. An electrolyte prepared by adding 5% by weight of a fluoroethylene carbonate to a mixed solvent of ethylene carbonate and diethyl carbonate of 1:1 (volume ratio) in which $LiPF_6$ were dissolved at a rate of 1 mol/L was used.

Then, the battery properties of the lithium ion battery were evaluated by the methods described above.

Example 2

(Preparation of Silicon Nanoparticle-Containing Hydrogen Polysilsesquioxane (2))

In a 200 mL poly beaker, 100 g of pure water and 31.0 g of silicon nanopowder (Nanomakers, Pure Si NM Si99, average particle size of 75 nm; Particles having a particle size of 1000 nm or more are not contained.) were put, and then treated by using an ultrasonic homogenizer and treatment was conducted for 2 minutes to prepare aqueous silicon dispersion. Into a 1000 mL three-neck flask, the aqueous silicon nanoparticle dispersion, 5.08 g (49 mmol) of 35% by weight concentration hydrochloric acid and 381 g of pure water were charged thereinto, the silicon nanoparticles were dispersed into whole aqueous solution with stirring at room temperature for 10 minutes, and 27.9 g (169.9 mmol) of a triethoxysilane (Tokyo Chemical Industry Co., Ltd.) was added dropwise thereto at 25° C. under stirring. After completion of dropwise addition, the hydrolysis reaction and the condensation reaction were carried out at 25° C. for 2 hours while the mixture was stirred.

After elapse of the reaction time, reaction products were filtrated by a membrane filter (pore size: 0.45 µm, hydrophilic) to collect a solid. The solid obtained was dried under reduced pressure at 80° C. for 10 hours to obtain 40.0 g of a silicon nanoparticle-containing hydrogen polysilsesquioxane powder (2).

(Preparation of Silicon Nanoparticle-Containing Hydrogen Polysilsesquioxane Calcined Product (2))

In the manner which is the same as Example 1, 9.83 g of the silicon nanoparticle-containing hydrogen polysilsesquioxane calcined product (2) was obtained by using 10.0 g of the silicon nanoparticle-containing hydrogen polysilsesquioxane powder (2). The infrared spectroscopy spectrum of the resulting silicon nanoparticle-containing hydrogen polysilsesquioxane calcined product (2) is shown in FIG. 1 (Shown as "Example 2" in FIG. 1).

(Preparation of Negative Electrode, and Preparation and Evaluation of Lithium Ion Battery)

A negative electrode was produced by using the silicon nanoparticle-containing hydrogen polysilsesquioxane calcined product (2) in the manner which is the same as Example 1, and the battery properties of a lithium ion battery including the negative electrode body were evaluated.

Example 3

(Preparation of Silicon Nanoparticle-Containing Hydrogen Polysilsesquioxane (3))

In a 100 mL poly beaker, 50 g of pure water and 17.6 g of silicon nanopowder (Nanomakers company, Pure Si Nm Si99, average particle size of 75 nm; Particles having a particle size of 1000 nm or more are not contained.)) were put, and then treated by using an ultrasonic homogenizer for 2 minutes to prepare aqueous silicon nanoparticle dispersion. Into a 500 mL three-neck flask, the aqueous silicon fine particle dispersion, 1.67 g (28 mmol) of acetic acid (Wako Pure Chemical Industries, special grade reagent) and 223 g of pure water were charged, the silicon nanoparticles were dispersed into whole aqueous solution with stirring at room temperature for 10 minutes, and 7.36 g (44.9 mmol) of a triethoxysilane (Tokyo Chemical Industry Co., Ltd.) was added dropwise thereto at 25° C. under stirring. After completion of dropwise addition, the hydrolysis reaction and the condensation reaction were carried out at 25° C. for 2 hours while the mixture was stirred.

After elapse of the reaction time, reaction products were filtrated by a membrane filter (pore size: 0.45 µm, hydrophilic) to collect a solid. The solid obtained was dried under reduced pressure at 80° C. for 10 hours to obtain 20.0 g of a silicon nanoparticle-containing hydrogen polysilsesquioxane powder (3).

(Preparation of Silicon Nanoparticle-Containing Hydrogen Polysilsesquioxane Calcined Product (3))

9.87 g of a silicon nanoparticle-containing hydrogen polysilsesquioxane calcined product (3) was prepared to obtain 10.0 g of the silicon nanoparticle-containing hydrogen polysilsesquioxane powder (3) in the manner which is the same as Example 1.

(Preparation of Negative Electrode, and Preparation and Evaluation of Lithium Ion Battery)

A negative electrode was produced by using the silicon nanoparticle-containing hydrogen polysilsesquioxane calcined product (3) in the manner which is the same as Example 1, and the battery properties of a lithium ion battery including the negative electrode body were evaluated.

Example 4

(Preparation of Silicon Nanoparticle-Containing Hydrogen Polysilsesquioxane Calcined Product (4))

9.81 g of a silicon nanoparticle-containing hydrogen polysilsesquioxane calcined product (4) was obtained in the manner which is the same as Example 1 except for that the calcination temperature in heat treatment was changed to 800° C. and 10.0 g of the silicon nanoparticle-containing hydrogen polysilsesquioxane powder (2) was used.

(Preparation of Negative Electrode, and Preparation and Evaluation of Lithium Ion Battery)

A negative electrode was produced by using the silicon nanoparticle-containing hydrogen polysilsesquioxane calcined product (4) in the manner which is the same as Example 1, and the battery properties of a lithium ion battery including the negative electrode body were evaluated.

The results of infrared spectroscopy measurement and the elemental analysis of the silicon nanoparticle-containing hydrogen polysilsesquioxane calcined products obtained in Examples 1 to 4, and the results of battery properties evaluation using the negative electrode produced by using each negative electrode active materials are shown in Table 1.

Comparative Example 1

A silicon monoxide powder having a maximum particle size of 20 µm by classifying commercially available silicon monoxide (Sigma-Aldrich Corp., under 325 mesh) by using stainless steel sieve having an opening of 20 µm was used as a silicon monoxide. 4.0 g of the silicon monoxide having a particle size of 20 µm or less and 16.0 g of silicon nanopowder (Sigma-Aldrich Corp., less than 100 nm; volume-basis mean particle size) are mixed by ball milling with planetary ball mill using a zirconia ball and a zirconia container for 10 minutes to obtain a silicon nanoparticle mix silicon oxide (1). The infrared spectrum of the silicon nanoparticle mix silicon oxide (1) is shown in FIG. 1 (In FIG. 1, "Comparative Example 1" is indicated.). 5 g of 2% by weight aqueous solution of carboxymethyl cellulose was added to the silicon nanoparticle mix silicon oxide (1), and subjected to boll milling with planetary ball mill using a zirconia ball and a zirconia container for 2 hours. Drying was conducted with a vacuum dryer at 100° C. for 8 hours to remove water to obtain a silicon nanoparticle complexed silicon oxide (1) (Comparative Example 1).
(Preparation of Negative Electrode)

A negative electrode was produced in the manner which is the same as Example 2 except that the silicon nanoparticle complexed silicon oxide (1) was used.
(Preparation and Evaluation of Lithium Ion Battery)

A lithium ion battery was produced in the manner which is the same as Example 1 using the silicon nanoparticle-containing hydrogen polysilsesquioxane calcined product (1), except that the negative electrode produced from the silicon nanoparticle complexed silicon oxide (1) was used, and the battery properties of a lithium ion battery including the negative electrode body were evaluated.

Comparative Example 2

(Preparation of Silicon Nanoparticle-Containing Hydrogen Polysilsesquioxane (5))

A silicon nanoparticle-containing hydrogen polysilsesquioxane powder (5) was prepared in the manner which is the same as Example 2 except that a silicon nanopowder made by Hongwu International Group Ltd #2 211 (Average particle size: 280 nm, D90: 1.4 μm, Particles having a particle size of 1000 nm or more were contained.) was changed. The results of Table 1 were shown in Table 1.
(Preparation of Silicon Nanoparticle-Containing Hydrogen Polysilsesquioxane Calcined Product (5)) 9.73 g of a silicon nanoparticle-containing hydrogen polysilsesquioxane calcined product (5) was obtained by using 10 g of the silicon nanoparticle-containing hydrogen polysilsesquioxane powder (5) in the manner which is the same as Example 1. Regarding the silicon nanoparticle-containing hydrogen polysilsesquioxane calcined product (5), a negative electrode was produced in the manner which is the same as Example 1. The battery properties of the lithium ion battery using the negative electrode were evaluated.

charge-discharge cycle, and high capacity maintenance rate. Therefore, by heat treatment, the specific silicon nanoparticle-containing hydrogen polysilsesquioxane can sufficiently endure in practically use as a negative electrode active material for battery and receive high evaluation as a useful compound capable of being a material available as a negative electrode material of new battery requiring high capacity.

As shown in Comparative Example 1, the battery properties of the battery including the negative electrode using the negative electrode active material produced from the silicon oxide having no chemical bond on the surface of silicon nanoparticle and no Si—H bond provided a certain level on the initial charge-discharge efficiency, compared with the battery properties produced in the same conditions as the negative electrode active material of the present invention. However, in Comparative Example 1, the capacity was suddenly reduced. Therefore, Comparative Example 1 could not reach the practical level as a lithium ion battery. Furthermore, as shown in Comparative Example 2, when silicon nanoparticles including particles having a particle size of 1000 nm or more were used as a substrate, the capacity was reduced to exceed the tolerance range, because the stress change due to expansion and contraction generated during the charge-discharge cannot sufficiently suppressed to break conductive paths of electrode by repeating the charge-discharge cycle, even if the silicon nanoparticles was complexed with the hydrogen polysilsesquioxane.

INDUSTRIAL APPLICABILITY

By using a negative electrode formed from a negative electrode active material for a lithium ion battery containing the silicon nanoparticle-containing hydrogen polysilsesquioxane of the present invention, the lithium ion battery having extremely higher capacity than the conventional carbon-based negative electrode material, practical initial charge-discharge efficiency and practical cycle properties can be used. For example, the present invention is useful technique in a battery filed, particularly, a secondary battery.

The invention claimed is:

TABLE 1

| | Calcination temperature | Element analysis (Mole Ratio) | | | Si particle | IR Peak Ratio | | Initial Charge Capacity | Initial Discharge Capacity | Initial Charge – Discharge Efficiency | Discharge Capacity at 80th cycle | Capacity Maintenance Rate |
|---|---|---|---|---|---|---|---|---|---|---|---|---|
| | ° C. | Si | O | H | weight % | $I_1/I_2$ | $I_{2-1}/I_{2-2}$ | mAh/g | mAh/g | % | mAh/g | % |
| Example 1 | 900 | 1.00 | 0.30 | 0.05 | 68.3 | 0.05 | 1.34 | 3021 | 2471 | 81.8 | 2189 | 88.6 |
| Example 2 | 900 | 1.00 | 0.20 | 0.06 | 77.8 | 0.06 | 1.58 | 3178 | 2755 | 86.7 | 2353 | 85.4 |
| Example 3 | 900 | 1.00 | 0.10 | 0.07 | 88.3 | 0.05 | 1.62 | 3256 | 2898 | 89.0 | 2399 | 82.8 |
| Example 4 | 300 | 1.00 | 0.21 | 0.12 | 77.8 | 0.10 | 1.32 | 3186 | 2734 | 85.8 | 2310 | 84.5 |
| Comparative Example 1 | — | 1.00 | 0.20 | 0 | 77.8 | 0 | — | 3125 | 2688 | 86.0 | 1269 | 47.2 |
| Comparative Example 2 | 900 | 1.00 | 0.21 | 0.05 | 77.8 | 0.05 | 1.24 | 3160 | 2733 | 86.5 | 1512 | 55.3 |

According to the results of the Examples, all the negative electrode active material for the lithium ion battery produced from the silicon nanoparticle-containing hydrogen polysilsesquioxane calcined product have higher initial charge-discharge capacity and higher discharge capacity at 50th cycle than conventional carbon-based negative electrode active materials, reduction in capacity decrease due to the 1. A silicon nanoparticle-containing hydrogen polysilsesquioxane calcined product represented by a general formula $SiO_xH_y$ (0.01<x≤0.3, 0<y<0.35) and having a Si—H bond,
wherein the silicon nanoparticle-containing hydrogen polysilsesquioxane calcined product has the following features (A) and (B):

(A) the silicon nanoparticle-containing hydrogen polysilsesquioxane calcined product contains more than 65.0% by weight of silicon nanoparticles having a volume-basis mean particle size of more than 10 nm and less than 500 nm and having no particle having a particle size of 1000 nm or more, and (B) the silicon nanoparticle-containing hydrogen polysilsesquioxane calcined product has a silicon oxide structure derived from a hydrogen polysilsesquioxane which covers the silicon nanoparticles and is chemically bonded to a surface of each of the silicon nanoparticles.

2. The silicon nanoparticle-containing hydrogen polysilsesquioxane calcined product according to claim 1, when an intensity of a maximum absorption peak within an absorption band of 820 to 920 $cm^{-1}$ derived from a Si—H bond is $I_1$ and an intensity of a maximum absorption peak within an absorption band of 1000 to 1250 $cm^{-1}$ derived from a Si—O—Si bond is $I_2$ in an spectrum obtained by measuring the silicon nanoparticle-containing hydrogen polysilsesquioxane calcined product by the infrared spectroscopy, an intensity ratio ($I_1/I_2$) is in a range of from 0.01 to 0.35.

3. The silicon nanoparticle-containing hydrogen polysilsesquioxane calcined product according to claim 1, wherein in absorption band of 1000 to 1250 $cm^{-1}$ derived from the Si—O—Si bond, when an intensity of a maximum absorption peak in a wavelength of 1100 $cm^{-1}$ or higher is $I_{2-1}$ and an intensity of a maximum absorption peak in a wavelength of 1100 $cm^{-1}$ or lower is $I_{2-2}$ in the spectrum obtained by measuring the silicon nanoparticle-containing hydrogen polysilsesquioxane calcined product by the infrared spectroscopy, an intensity ratio ($I_{2-1}/I_{2-2}$) is greater than 1.

4. A negative electrode active material for a lithium ion battery comprising the silicon nanoparticle-containing hydrogen polysilsesquioxane calcined product according to claim 1.

5. A negative electrode for a lithium ion battery comprising the negative electrode active material for a lithium ion battery according to claim 4.

6. A lithium ion battery comprising the negative electrode for a lithium ion battery according to claim 5.

* * * * *